(No Model.) 2 Sheets—Sheet 1.
D. BÁNKI & J. CSONKA.
GASOLENE MOTOR.
No. 595,552. Patented Dec. 14, 1897.
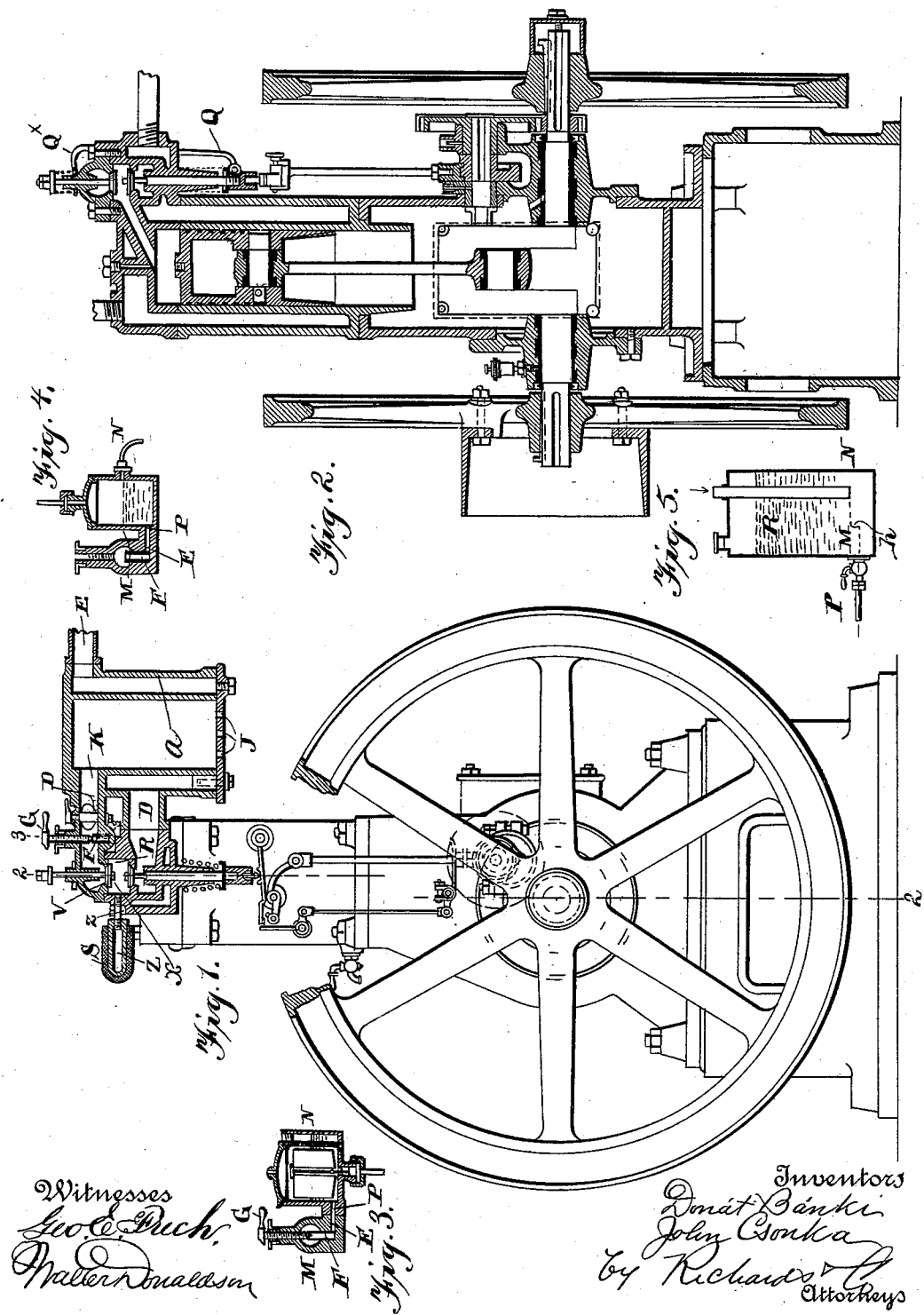
Witnesses
Geo. E. Buch.
Walter Donaldson
Inventors
Donát Bánki
John Csonka
by Richards
Attorneys (No Model.) 2 Sheets—Sheet 2.

D. BÁNKI & J. CSONKA.
GASOLENE MOTOR.

No. 595,552. Patented Dec. 14, 1897.

Witnesses
Geo. E. Fuch.
Walter N. Maldsay

Inventors
Donát Bánki
John Csonka
by Richards & Co.
Attorneys

UNITED STATES PATENT OFFICE.

DONÁT BÁNKI AND JOHN CSONKA, OF BUDA-PESTH, AUSTRIA-HUNGARY.

GASOLENE-MOTOR.

SPECIFICATION forming part of Letters Patent No. 595,552, dated December 14, 1897.

Application filed November 30, 1896. Serial No. 614,020. (No model.)

*To all whom it may concern:*

Be it known that we, DONÁT BÁNKI and JOHN CSONKA, subjects of the King of Hungary, residing in Buda-Pesth, in the Kingdom of Hungary, have invented certain new and useful Improvements in Gasolene-Engines, of which the following is a specification.

We have made improvements on gasolene-motors which in the main principle refer to the manner of and means for introducing the gasolene into the device for obtaining a sufficient mixture and to the construction of a combustion-chamber which accomplishes the combustion of the mixture without the help of any exterior heating.

Our invention is illustrated in the accompanying drawings, in which—

Figure 6:
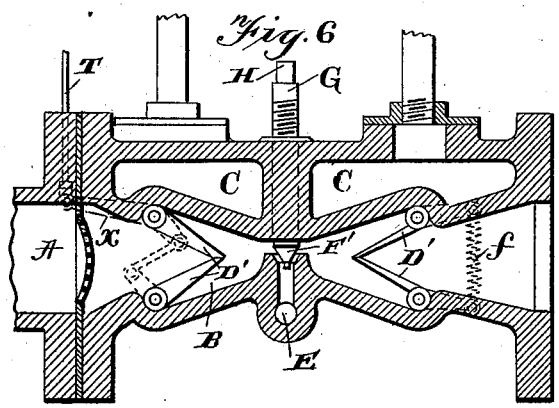
Figure 7:
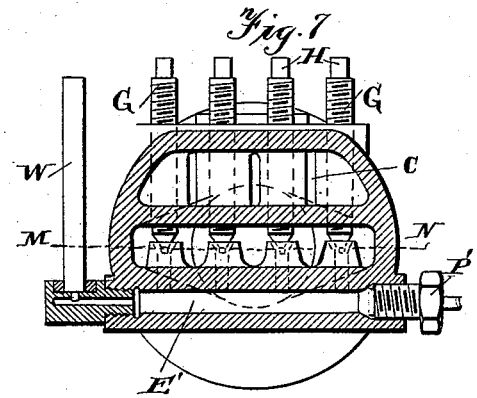
Figure 8:
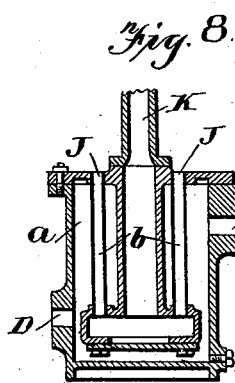
Figure 9:
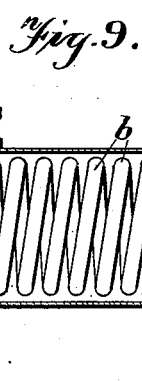
Figure 10:
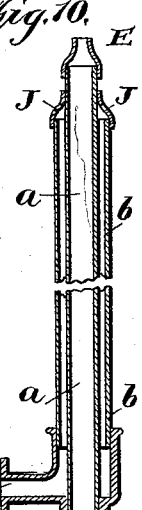
Figure 11:
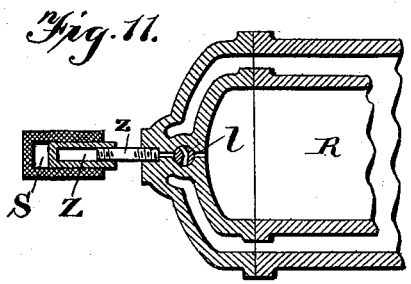
Figure 12:
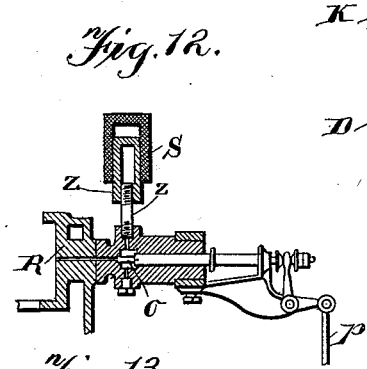
Figure 13:
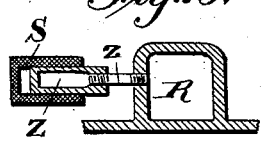

Figure 1 is a side elevation of the engine, partly in section. Fig. 2 is a section on line 2 2 of Fig. 1. Figs. 3, 4, and 5 are views of different forms of reservoirs for maintaining the gasolene-supply at a constant level, Fig. 3 being a section on line 3 3 of Fig. 1. Fig. 6 is a longitudinal vertical section of a modified form of the feeding device. Fig. 7 is a transverse vertical section of the same. Figs. 8, 9, and 10 are modified forms of heating devices; and Figs. 11, 12, and 13 are detail views showing modified forms of igniting devices.

The device for producing a combustible mixture, which for brevity we call the "feeding" device, is arranged in the suction-tube before the main valve V, Fig. 1, Sheet I. This is arranged in such a way that during the period of suction a certain quantity of fluid is sucked into the air-pipe and drawn violently into the cylinder.

In the wall of the air-pipe K is an opening or passage F, which communicates with a tube or passage P, leading to a gasolene-reservoir M, which is adapted to maintain the gasolene at a uniform level.

In Figs. 3, 4, and 5 there are three different constructions shown for the regulation of this constant level of the liquid. In Fig. 3 is shown a float S in the liquid, and connected with this float is a small valve which may be closed by the float as soon as the same rises and opens again as soon as the level of the gasolene falls, lowering the float. The play of this float holds in this way the liquid in nearly exact constant height. In Fig. 4, Sheet I, is shown an escape-pipe in the level M N, which does not allow a rise of the level. In Fig. 5 the liquid is closed in a vessel, and an air-tube extends down therein to the line M N, and thus there is a discharge-pressure on the liquid equal to the height M $h$, tending to discharge the liquid at the cock P.

In Fig. 7 is the level of the gasolene visible on a gage-tube W.

In Figs. 6 and 7 is shown a modified arrangement of the feeding device, in which four openings F' are provided in the chamber B, which communicate with the boring E' and gasolene-tube P'.

The area of the openings F" is controllable by means of screws G, which end in points of a conical form. These screws may be provided with a central longitudinal boring H, Figs. 6 and 7, through which air may be sucked in during the period of suction, whereby a complete dispersion of the gasolene will result.

The introduction of air may be regulated either by hand by means of a throttle-valve D, Fig. 1, Sheet I, or else automatically by the suction of air. Such an automatically-acting throttle-valve is shown in Fig. 6.

The lids D are kept closed by means of the spiral spring $f$ and open only in case there should be a decrease of atmospheric pressure in chamber B, and in proportion to this decrease of pressure in chamber B the lids consequently regulate the degree of diminution of pressure.

In box B, Figs. 6 and 7, is a chamber C, through which the waste gases pass at K and L in order to heat the explosive mixture.

In order not to change the mixture produced by means of our atomizer in the cylinder by condensation, so that the mixture remains easily inflammable and the combustion-tube cannot be cooled through the contact with the mixture, we heat the air which we use for feeding our engine. By the heating of the feed-air and the use of a conveniently-constructed combustion-tube we attain this, that we dispense with a continuouslyburning light, as the combustion-tube in the cylinder is constantly kept in a red-hot state by the explosions.

In our experience with the construction described the ignition-tube remains red hot even if the engine is running without load and the explosions occur at longer intervals, in case it is made from a good heat-conducting material, and has a sufficiently large boring, in order to receive a corresponding amount of heat, in case the engine is fed with previously-heated air, in case the tube is protected by a convenient cover against cooling off, and, finally, if care is taken, that not too much heat is lost by the contact with the walls of the cylinder. On this base are constructed the heating devices for air, as shown in Sheet I, Fig. 1, and Sheet II, Figs. 8, 9, and 10, and the ignition devices, as shown in Sheet I, Fig. 1, and Sheet II, Figs. 11, 12, and 13.

The heating of the air is produced in all the constructions shown by the waste gases of the engine. In Sheet I, Fig. 1, A is an escape-box, in which the waste gases are introduced at D and from which the latter escape at E. In this cylinder is a second cylinder or box C, which heats the air entering at T, and being conducted to the engine at K. In Sheet II, Figs. 8 and 9, we find a modification of this construction in so far as in the escape-box A instead of the second cylinder or box C is set a system of air-tubes $b$, respectively a single spiral air-tube $b$ in Fig. 9.

A second modification of the heating device is shown in Sheet II, Fig. 10, where on top of the escape-tube $a$ is pushed a wider tube $b$, having air-holes T. Both tubes are placed in a joint-fitting having one flange D for the escape-tube and a second, E, for the air-feed pipe.

The ignition-tube consists in a thick metal tube Z, (the best of copper,) which communicates through a thinner tube $z$ with the combustion-chamber R, Sheet I, Fig. 1, and Sheet II, Figs. 11, 12, and 13. Over the ignition-tube Z is drawn a packing-tube S, made of asbestos.

In Sheet I, Fig. 1, and Sheet II, Fig. 8, there is no valve-gear shown for the ignition, but in Sheet II, Figs. 11 and 12, is shown a provision for the correct ignition by the insertion of a stop-cock $l$, which opens at the point of ignition respectively of a valve O, which is acted upon by means of the lever $p$.

The combination, with the ignition-tube, of a thicker and a thinner tube is an important point of construction of our automatic ignition device. The dimensions of the area of the ignition-tube have to be calculated in such a way that the interior surface, taking up the heat, and the exterior surface, radiating the heat, must be in a defined proportion. This necessitates a thick ignition-tube. This thick tube does not answer for the connection with the combustion-room, as this thick tube would be too much heated if screwed in an uncooled wall and the combustions would be irregular, or, if screwed in a cooled wall, the cooling off would be so great that the tube could not be kept in a red-hot state. Hereby is the use of a thin connection-piece explained, which conducts only a little heat.

In close connection with the feed device previously described are the manner and means for the regulation of speed of our gasolene-engine. As in our feed device an inflammable mixture is produced, as soon as air is sucked into the cylinder the suction-valve has to be kept closed if, for the purpose of regulating the speed, the explosions should temporarily cease. The suction-valve remains closed during the suction period if the escape-valve remains open, and therefore we allow the regulator to act upon the escape-valve in the well-known manner. In order to prevent the opening of the suction-valve, even in case of the use of a weak suction-spring, this spring may be connected with the escape-valve by means of a rod Q, Sheet I, Fig. 2, in such a way that the suction-spring is compressed as long as the escape-valve is kept open. The upper end of the rod Q appears at $Q^\times$ in contact with this spring to compress it when the escape-valve is open. Another way of regulating consists in introducing a combustible charge into the engine at each suction stroke, whereby the quantity of such charge has to be regulated by some centrifugal governor. Such a regulation is shown in Sheet II, Fig. 6. The throttle-valves D' D' and the rod T of the governor are in connection by some convenient means—such, for instance, as the lever X, Fig. 6, shown in dotted lines—which, according to the position of the governor, regulate the quantity of the mixture and allow a more or less complete charge of the cylinder. In order to keep the mixture in case of this regulation as constant as possible, the automatically-acting lids D D are employed. They regulate the degree of depression in the atomizing-chamber B, on which degree the proportion of the mixture mainly depends. As the cylinder receives more or less of the mixture the explosion will be more or less violent, whereby the regulation of the speed results.

We claim—

1. In a gasolene-engine, having the Otto circle, an atomizer, which is placed in the air-inlet and characterized by one or more openings in the air-pipe for the introduction of gasolene having the level of the fluid at a constant height, the efflux area of which is regulated by adjustable cones, having longitudinal borings through which atomizing-air is brought into the fluid by the suction.

2. In an explosive-engine, the combination with the air-supply pipe or inlet, of an atomizer therein for introducing gasolene, and a check-valve in the air-pipe in rear of said atomizer comprising the pivoted plates having extensions or arms, and the spring connecting said arms for holding the plates together to close the opening and permitting them to separate under pressure of the air, substantially as described.

3. In an explosive-engine, the combination with the air-supply pipe or inlet, of the atomizer for the injection of gasolene therein, the spring-pressed pivoted plates forming a check-valve in rear of said atomizer, and the pivoted plates in front of said atomizer forming a throttle-valve and adapted to be operated by a suitable governor, substantially as described.

In witness whereof we have hereunto set our hands in presence of two witnesses.

DONÁT BÁNKI.
JOHN CSONKA.

Witnesses:
PAUL BILOSKEY,
ORRIN GERSTERY.